United States Patent
Yan et al.

(10) Patent No.: US 12,017,419 B1
(45) Date of Patent: Jun. 25, 2024

(54) THREE-DIMENSIONAL ORTHOGONAL WOVEN COMPOSITE OUTLET GUIDE VANE AND MANUFACTURING METHOD THEREOF

(71) Applicant: BEIHANG UNIVERSITY, Beijing (CN)

(72) Inventors: Shibo Yan, Beijing (CN); Weijie Zhang, Beijing (CN); Yiding Li, Beijing (CN); Ying Yan, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/400,437

(22) Filed: Dec. 29, 2023

(30) Foreign Application Priority Data

Jan. 4, 2023 (CN) .......................... 202310006932.6

(51) Int. Cl.
*B29C 70/24* (2006.01)
*B29C 70/48* (2006.01)
(Continued)

(52) U.S. Cl.
CPC .............. *B29C 70/24* (2013.01); *B29C 70/48* (2013.01); *D03D 25/005* (2013.01);
(Continued)

(58) Field of Classification Search
CPC ...... B29C 70/24; B29C 70/48; D03D 25/005; B29K 2105/0845; B29K 2995/0097; B29L 2031/08
See application file for complete search history.

(56) References Cited

U.S. PATENT DOCUMENTS

| 8,499,450 | B2 * | 8/2013 | Naik | .................... D03D 13/004 29/889.71 |
| 8,696,319 | B2 * | 4/2014 | Naik | ................. B29D 99/0025 416/229 A |

(Continued)

FOREIGN PATENT DOCUMENTS

| CN | 102232020 A | 11/2011 |
| CN | 113547772 A | 10/2021 |

(Continued)

OTHER PUBLICATIONS

PCT International Search Report in corresponding International Appl. No. PCT/CN2023/109067 dated Aug. 7, 2023.
(Continued)

*Primary Examiner* — Robert H Muromoto, Jr.
(74) *Attorney, Agent, or Firm* — Ostrager Chong Flaherty & Broitman P.C.

(57) ABSTRACT

A three-dimensional orthogonal woven composite outlet guide vane and a manufacturing method are provided. Near-net-shaped manufacturing of the outlet guide vane is realized, and a vane profile-platform junction of the outlet guide vane is reinforced by designing a bifurcation of the preform. A basic structure of a three-dimensional orthogonal woven composite and a bifurcation of the vane profile-platform junction are used, so that the ultimate strength under tension, compression and bending of the outlet guide vane structure are significantly improved, and the weight of the outlet guide vane is reduced. Structural load bearing and force transmission functions of a strut are provided by the outlet guide vane while the functions of vane rectification, noise reduction and others are ensured. As a result, the weight and dimensions of an aeroengine, as well as structural complexity, are reduced by removing struts.

16 Claims, 15 Drawing Sheets

(51) Int. Cl.
  *D03D 25/00* (2006.01)
  *B29K 105/08* (2006.01)
  *B29L 31/08* (2006.01)
  *D03D 13/00* (2006.01)

(52) U.S. Cl.
  CPC ............... *B29K 2105/0845* (2013.01); *B29K 2995/0097* (2013.01); *B29L 2031/08* (2013.01)

(56) References Cited

U.S. PATENT DOCUMENTS

| | | | | |
|---|---|---|---|---|
| 9,033,673 | B2* | 5/2015 | Roussille | F01D 5/282 416/229 A |
| 9,045,992 | B2* | 6/2015 | Roussille | F01D 5/225 |
| 9,080,454 | B2* | 7/2015 | Coupe | C04B 35/62873 |
| 9,103,215 | B2* | 8/2015 | Fromentin | B22F 5/04 |
| 9,506,355 | B2* | 11/2016 | Nunez | C04B 35/62873 |
| 9,828,991 | B2* | 11/2017 | Muramatsu | F04C 14/226 |
| 11,186,014 | B2* | 11/2021 | Six | B29B 11/16 |
| 11,255,203 | B2* | 2/2022 | Eberling-Fux | B28B 19/00 |
| 11,591,921 | B1* | 2/2023 | Whittle | F01D 9/042 |
| 2011/0182743 | A1* | 7/2011 | Naik | B29D 99/0025 29/889.71 |
| 2011/0311368 | A1* | 12/2011 | Coupe | B29C 70/24 416/241 A |
| 2012/0201686 | A1* | 8/2012 | Fromentin | F01D 5/147 416/223 R |
| 2013/0101429 | A1* | 4/2013 | Roussille | F01D 5/147 264/103 |
| 2013/0243603 | A1* | 9/2013 | Naik | F01D 5/147 442/205 |
| 2013/0243604 | A1* | 9/2013 | Roussille | F01D 5/282 29/889.22 |
| 2014/0030076 | A1* | 1/2014 | Nunez | C04B 35/571 29/889.7 |
| 2016/0084249 | A1* | 3/2016 | Muramatsu | F04C 15/06 418/26 |
| 2020/0206978 | A1* | 7/2020 | Six | B29B 11/16 |
| 2020/0269468 | A1* | 8/2020 | Eberling-Fux | C04B 35/5805 |
| 2023/0193766 | A1* | 6/2023 | Postec | B29C 65/00 416/230 |

FOREIGN PATENT DOCUMENTS

| | | | |
|---|---|---|---|
| CN | 113818121 | A * | 12/2021 |
| CN | 113818121 | A | 12/2021 |
| CN | 15949471 | A | 4/2023 |
| CN | 115949471 | A | 4/2023 |

OTHER PUBLICATIONS

PCT Written Opinion in corresponding International Appl. No. PCT/CN2023/109067 dated Aug. 7, 2023.
Notification to Grant Patent Right for Invention dated Nov. 29, 2023 from the National Intellectual Property Administration of the People's Republic of China in Application No. 202310006932.6 of Applicant Beihang University including allowed claims.
First Office Action dated Oct. 7, 2023 from the National Intellectual Property Administration of the People's Republic of China in Application No. 202310006932.6 of Applicant Beihang University.

* cited by examiner

THREE-DIMENSIONAL ORTHOGONAL WOVEN COMPOSITE OUTLET GUIDE VANE AND MANUFACTURING METHOD THEREOF

CROSS REFERENCE TO RELATED APPLICATION

This patent application claims the benefit and priority of Chinese Patent Application No. 202310006932.6 filed with the China National Intellectual Property Administration on Jan. 4, 2023, the disclosure of which is incorporated by reference herein in its entirety as part of the present application.

TECHNICAL FIELD

The present disclosure relates to the technical field of composite material structures, and in particular, to a three-dimensional orthogonal woven composite outlet guide vane and a manufacturing method thereof.

BACKGROUND

Three-dimensional weaving technology is a weaving technology for tying several warp and weft layers by using a multi-layer warp weaving method to form a three-dimensional integral preform with a certain thickness. The preform has high production efficiency, strong designability, and excellent near-net-shaped manufacturing ability for complex structures. In recent years, three-dimensional woven composite materials, as an enabling technology, have been first applied to critical structures of high-end equipment in the aerospace field.

Currently, most modern civil and military aircraft are powered by turbofan jet engines. As an essential component of a turbofan jet engine structure, an outlet guide vane has the function of rectifying the airflow at a fan outlet and increasing thrust, A strut for supporting an outer duct and a case is also arranged near an outlet of the outer duct. Compared with the outlet guide vane, the strut is thick and long, which has a significant impact on the aerodynamic flow at the outer duct.

In order to improve the aerodynamic performance and reduce the noise, dimensions and weight of an aeroengine, a current common design is to arrange the strut and the outlet guide vane side by side. The improvement of this design is limited and more variables are introduced into the design and optimization of the structure, and the design difficulty and structural complexity are greatly increased.

SUMMARY

An objective of the present disclosure is to provide a three-dimensional orthogonal woven composite outlet guide vane and a manufacturing method thereof. The three-dimensional orthogonal woven composite outlet guide vane manufactured by the present disclosure not only retains the functions of vane rectification and noise reduction, but also achieves force bearing and transmission through the vane, reduces the complexity of an outlet guide vane-strut structure, shortens the length of an aeroengine, and promotes the integration of structure and function.

To achieve the above objective of the present disclosure, the present disclosure provides the following technical solutions.

The present disclosure provides a manufacturing method for a three-dimensional orthogonal woven composite outlet guide vane, including the following steps:

(1) setting weaving parameters of a vane profile area and parameters of a platform area according to requirements for geometric dimensions of the outlet guide vane;

(2) setting a bifurcation of a vane profile-platform junction according to the requirements for the geometric dimensions of the outlet guide vane in step (1) and the requirements for the mechanical performance of the outlet guide vane under different loads;

(3) weaving a preform of the three-dimensional orthogonal woven outlet guide vane according to conditions set in steps (1) and (2); and (4) sequentially forming the preform and manufacturing the three-dimensional orthogonal woven composite outlet guide vane.

Preferably, step (1) includes:

(11) calculating an equivalent thickness $t_1=V_1/lh$ of the vane profile area according to a vane profile chord length $l$, a platform inner surface spacing $h$, and a volume $V_1$ of the vane profile area, and with the equivalent thickness $t_1$ of the vane profile area as a basic thickness, setting a number $n_j$ of warp layers and a number $n_w$ of weft layers in the vane profile area to satisfy $n_j=n_w-1$;

(12) setting fiber volume fraction of the vane profile area to be 40%-60% by controlling warp density and weft density of the vane profile area;

(13) enabling the vane profile area of the preform to meet vane profile requirements by controlling weft filament count, warp filament count, and yarn density in different areas of the vane profile area; and

(14) setting a basic thickness of the platform area to $t_3=0.5t_1$, the number of warp layers in the platform area to $0.5n_j$, and the number of weft layers in the platform area to $0.5n_j+1$.

Preferably, $n_j \geq 3$.

Preferably, the fiber volume fraction of the platform area is kept the same as that of the vane profile area.

Preferably, step (2) includes:

numbering the wefts in the vane profile area of the preform of the three-dimensional woven outlet guide vane as $w_1$-$w_{2n}$ along the thickness direction, where n is an integer: the number of the wefts in the vane profile area is even: the wefts numbered as $w_{n+1}$ and $w_{n+2}$ or the wefts numbered as $w_{n-1}$ and $w_n$ are located at a same layer in a two-fold form:

changing distribution of the wefts by controlling a heald lifting of the warps, so that positions of the wefts in the vane profile-platform junction are changed along the thickness direction, and numbering the changed wefts in the platform area along the thickness direction as

**

$w_1$-$w_{2n}$; and a set composed of the weft numbers in the vane profile area and the platform area being in a one-to-one mapping relationship, and 2n wefts having 2n factorial methods of bifurcation.

Preferably, a device configured for weaving includes a jacquard or a three-dimensional loom.

Preferably, the weaving in step (3) includes:

(31) weaving the vane profile area and the platform area: sequentially lifting, from bottom to top, the warps above a position where a target weft is located, and sequentially inserting the wefts; and

(32) weaving the vane profile-platform junction:
  sequentially adding the wefts $w_1$ to $w_{2n}$, and lifting, on a side of the vane profile-platform junction near the vane profile area, the warps above a position where a target weft $w_i$ is located: lifting, on a side of the vane profile-platform junction near the platform area, the warps above a position where a target number weft $w_i^*$ corresponding to $w_i$ is located, inserting the wefts, and repeating this process.

Preferably, the forming process includes: sequentially compacting and fastening the vane profile area, expanding the vane profile-platform junction, compacting the vane profile-platform junction and compacting, and fastening the platform area by means of molds in the order of the vane profile area, the vane profile-platform junction and the platform area, to complete the forming of the preform of the outlet guide vane, and fastening the molds.

Preferably, the method for manufacturing is resin transfer molding.

The present disclosure provides a three-dimensional orthogonal woven composite outlet guide vane prepared by the manufacturing method described in the above technical solution.

The present disclosure provides the manufacturing method of the three-dimensional orthogonal woven composite outlet guide vane. According to the present disclosure, a method of bifurcation, a method of increasing or decreasing weft filament count and other methods are adopted, so that near-net-shaped manufacturing of the composite outlet guide vane can be realized. The vane profile-platform junction of the outlet guide vane is reinforced by designing a method of bifurcation of the preform, and the continuity and integrity of a fiber structure inside a member are maintained. Manufacturing cost of the member can be reduced by eliminating prepreg/fabric cutting, laminating processes and using an out-of-autoclave technology, and delamination resistance and damage tolerance of the member can be improved by means of the internal integral fiber structure. A basic structure of a three-dimensional orthogonal woven composite and a bifurcation of the vane profile-platform junction are adopted, so that the ultimate strength under tension, compression, and bending of the outlet guide vane structure are significantly improved. According to the present disclosure, the functions of structural load bearing and force transmission of a strut are provided by the outlet guide vane while the functions of vane rectification, noise reduction and other functions are ensured. As a result, the weight and dimensions of an aeroengine, as well as structural complexity, are reduced by removing struts.

The manufacturing process proposed in the present disclosure is relatively simple, and the types of manufacturing equipment adopted for the manufacturing process have a high degree of automation, so that production efficiency can be effectively improved, and production costs can be reduced.

DETAILED DESCRIPTION OF THE EMBODIMENTS

The present disclosure provides a manufacturing method of a three-dimensional orthogonal woven composite outlet guide vane, including the following steps:
  (1) setting weaving parameters of a vane profile area and parameters of a platform area according to the requirements for geometric dimensions of an outlet guide vane;
  (2) setting a bifurcation of a vane profile-platform junction according to the requirements for the geometric dimensions of the outlet guide vane in step (1) and the requirements for mechanical performance of the outlet guide vane under different loads;
  (3) weaving a preform of the three-dimensional orthogonal woven outlet guide vane according to conditions set in steps (1) and (2);
  (4) sequentially forming the preform and manufacturing the three-dimensional orthogonal woven composite outlet guide vane.

In the present disclosure, a structural schematic diagram of the three-dimensional orthogonal woven composite outlet guide vane is shown in FIG. 1A-1D, including a vane profile area, a platform area, and a vane profile-platform junction.

According to the present disclosure, the parameters of the vane profile area and the parameters of the platform area are set according to the requirements for geometric dimensions of the outlet guide vane. In the present disclosure, the parameter of the vane profile area and the parameter of the platform area preferably include a number of warp layers, warp density, a number of weft layers, weft density, and weft filament count in different areas.

In the present disclosure, setting the parameters of the vane profile area and the parameters of the platform area preferably includes the following steps:

(11) calculating an equivalent thickness $t_1=V_1/lh$ of the vane profile area according to vane profile chord length l, platform inner surface spacing h, and volume $V_1$ of the vane profile area, and with the equivalent thickness $t_1$ of the vane profile area as a basic thickness, setting number $n_j$ of warp layers and number $n_w$ of weft layers in the vane profile area to satisfy $n_j=n_w-1$, where $n_j$ is preferably greater than or equal to 3, more preferably 20-24;

(12) setting fiber volume fraction of the vane profile area to be 40%-60%, more preferably 45%-50%, by controlling warp density and weft density of the vane profile area;

(13) enabling the vane profile area of the preform to meet vane profile requirements by controlling weft filament count, warp filament count, and yarn density in different areas of the vane profile area;

(14) setting a basic thickness of the platform area to $t_3=0.5t_1$, the number of warp layers in the platform area to $0.5n_j$, and the number of weft layers in the platform area to $0.5n_j+1$.

In the present disclosure, based on 12 k, yarns in the vane profile area are added in integer multiples, or are reduced to be 6 k or 3 k.

Figure 1A:
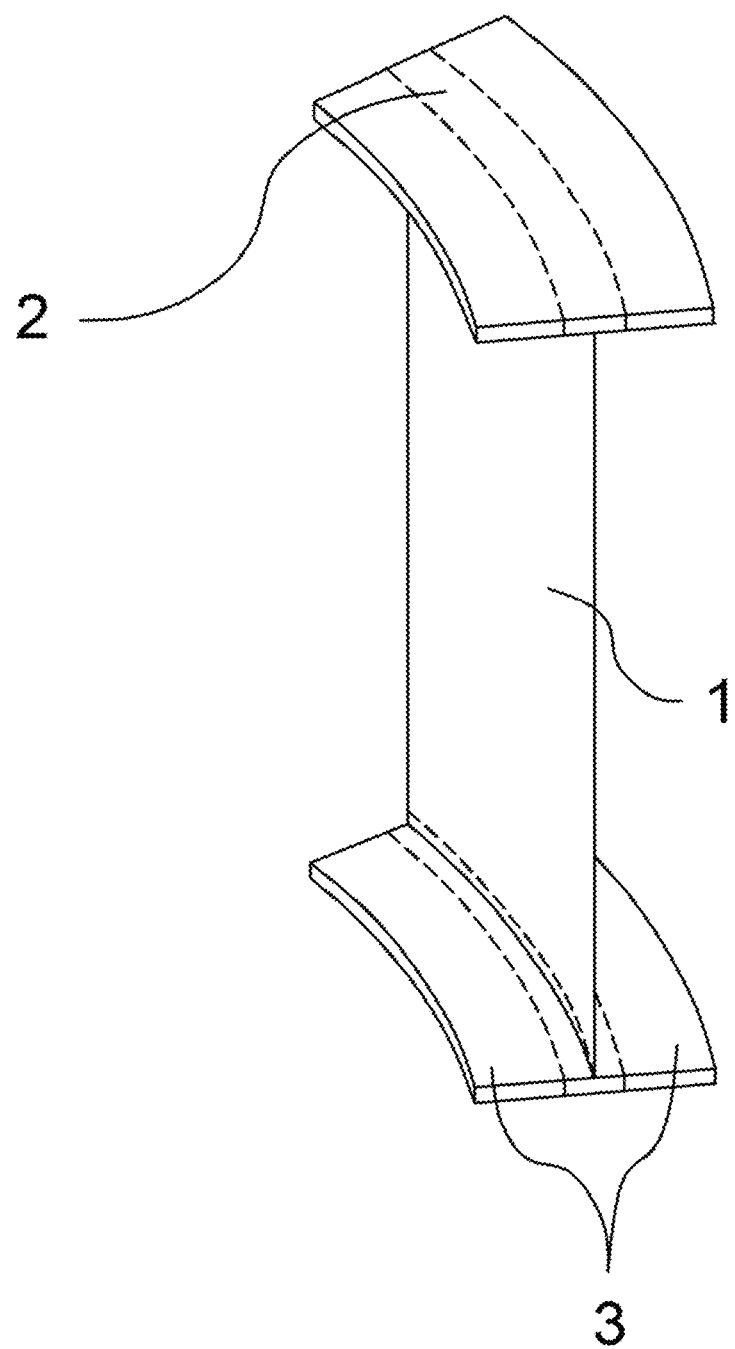
FIGS. 1A to 1D are structural schematic diagrams of a three-dimensional orthogonal woven composite outlet guide vane, where a vane profile area 1, a vane profile-platform junction 2 and a platform area 3 are shown.
Figure 1B:
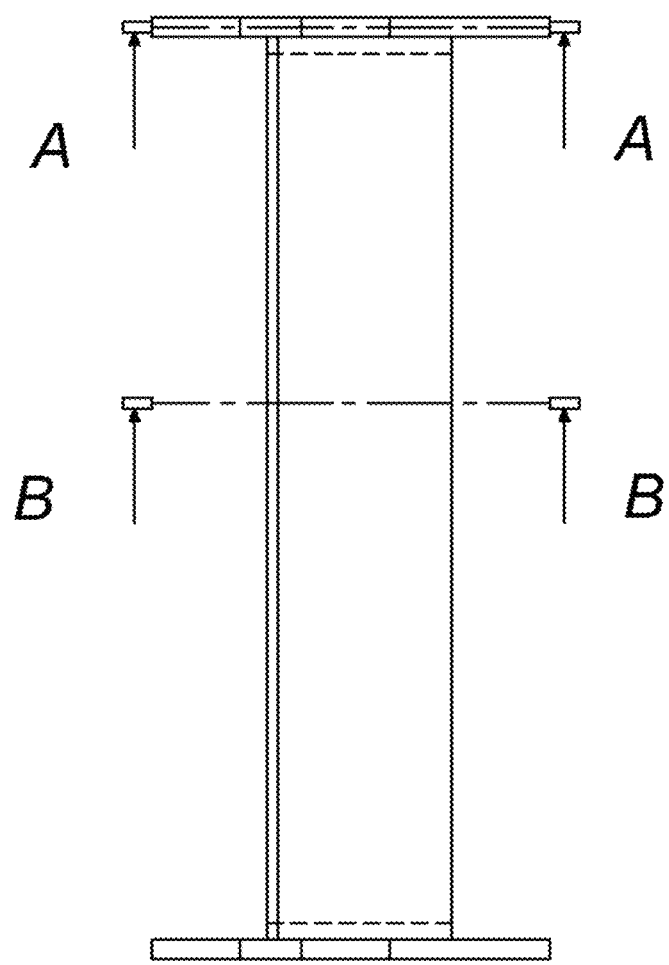
Figure 1C:
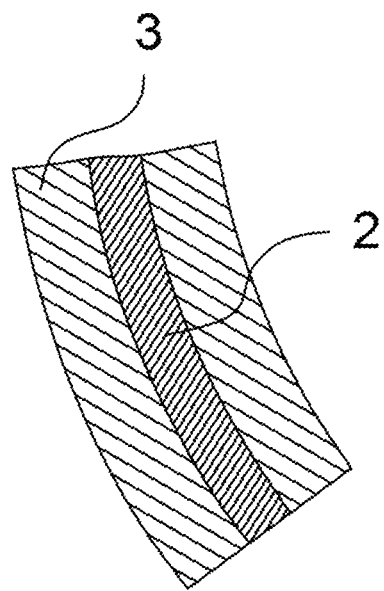
Figure 1D:
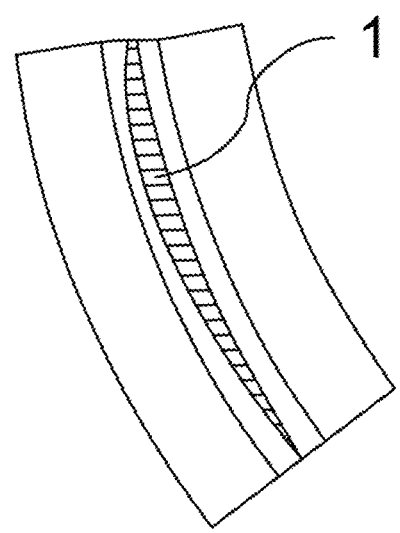
Figure 2:
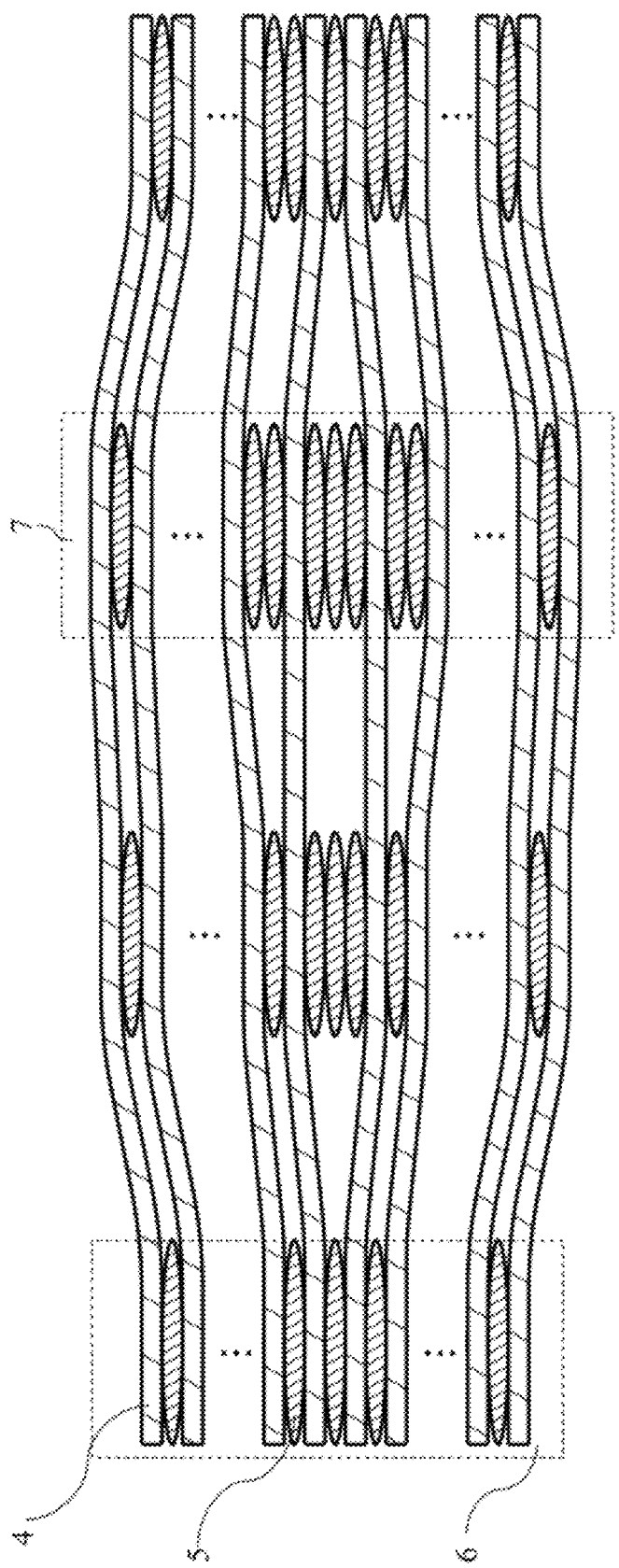
FIG. 2 is a schematic diagram of the variable cross-section of a preform in a vane profile area (the z-direction yarns are omitted), where warps 4, wefts 5, an area 6 with a basic thickness (the thickness of the alternately superimposed wefts and warps without adding yarns), and an area 7 where an interface thickness is changed with the added wefts are shown.
Figure 3A:
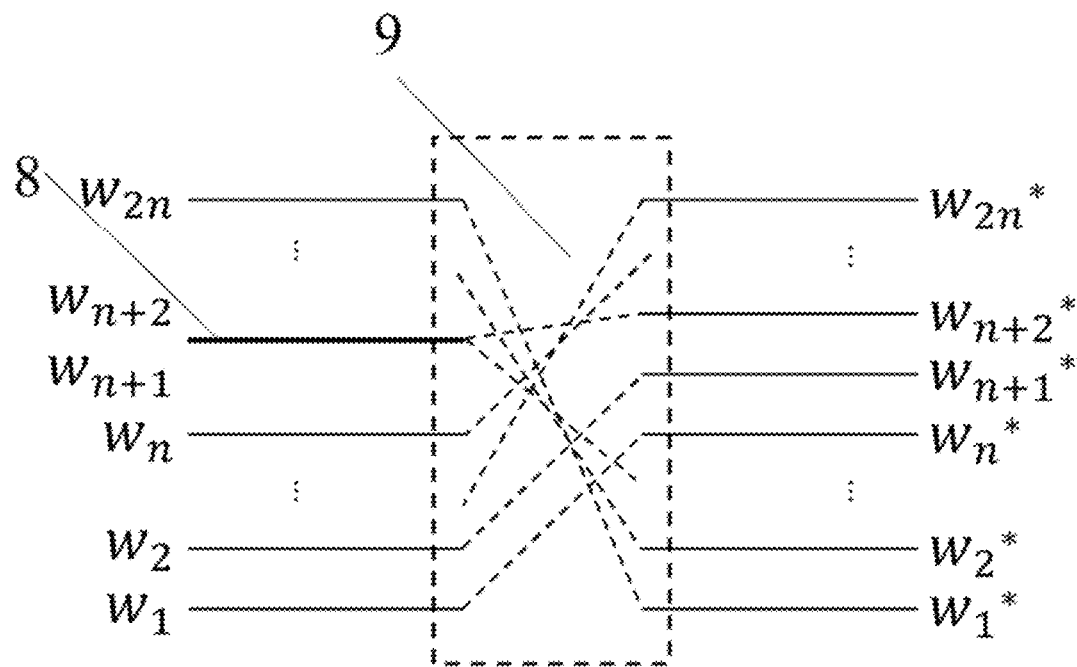
FIGS. 3A to 3D are schematic diagrams of a bifurcation structure of a vane profile-platform junction, where wefts 8 in a two-fold form, a bifurcation structure 9), an uncrossed structure 10, a crossed structure 11 and a crossed and entangled structure 12 are shown.
Figure 3B:
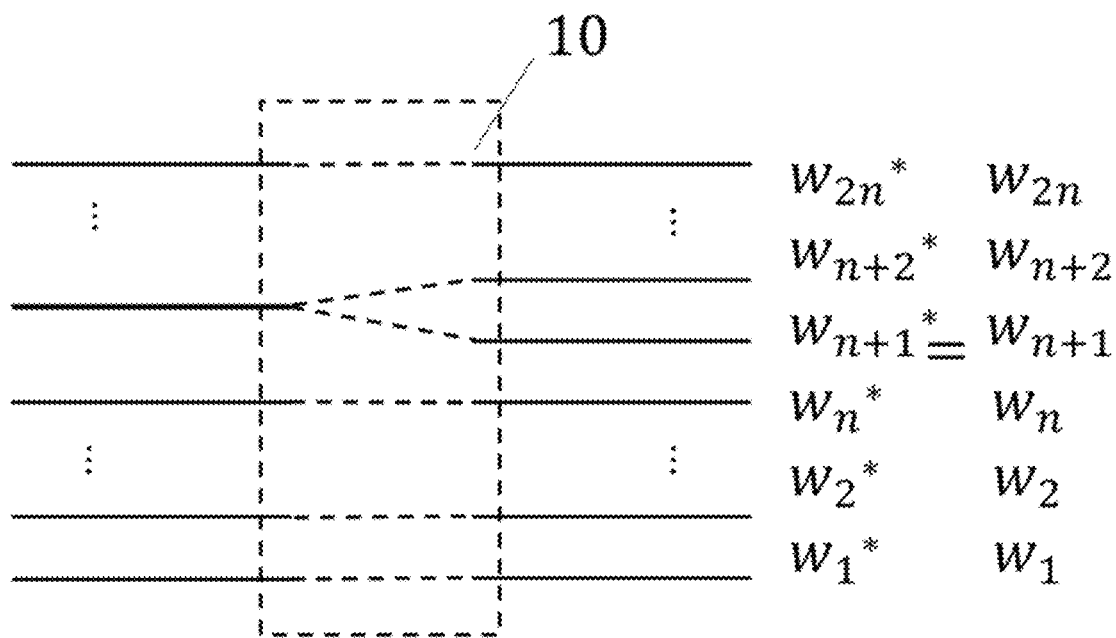
Figure 3C:
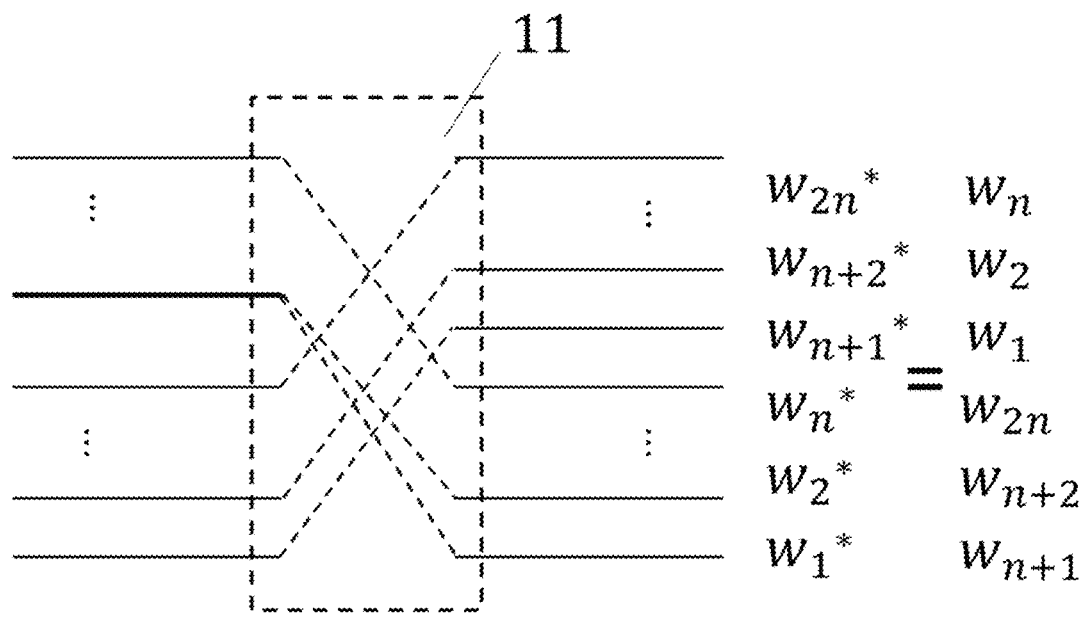
Figure 3D:
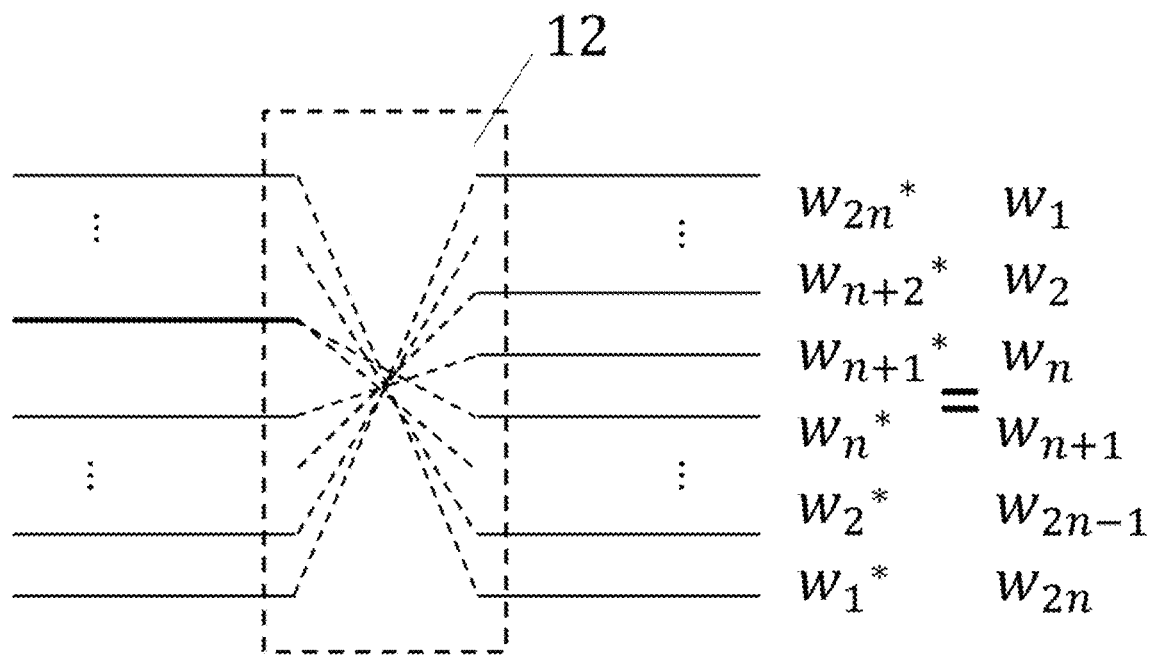

In the present disclosure, a schematic diagram of the variable cross-section of the vane profile area is shown in FIG. 2. The vane profile area shows a thickness change in a chord direction, with different thicknesses at different cross-sectional positions.

In the present disclosure, the warp density and the weft density of the platform area are determined according to specific requirements for fiber volume fraction.

In the present disclosure, the fiber volume fraction of the platform area is preferably kept the same as that of the vane profile area.

In the present disclosure, a bifurcation of a vane profile-platform junction is set according to the requirements for the geometric dimensions of the outlet guide vane and requirements for the mechanical performance of the outlet guide vane under different loads. In the present disclosure, setting a bifurcation of the vane profile-platform junction preferably includes: obtaining different bifurcation structures of the vane profile-platform junction by designing distribution of wefts and jacquard patterns. In the present disclosure, when an area of the preform is reinforced by different z-direction yarns in the thickness direction, instead of interlocking the entire preform with z-direction yarns running through the thickness, a locally unreinforced plane is formed between the yarn layers, and the preform can be unfolded on this plane to form a bifurcation. In the present disclosure, each warp in each layer is controlled by means of a jacquard weaving technique, for example, so that the positions of the wefts before and after a bifurcation area change in the thickness direction, manufacturing a crossed or entangled bifurcation structure.

In the present disclosure, the step of setting a bifurcation of the vane profile-platform junction preferably includes:

numbering the wefts in the preform of the vane profile area of the three-dimensional woven outlet guide vane as $w_1-w_{2n}$ along the thickness direction, where n is an integer; the number of the wefts in the vane profile area is even: the wefts numbered as $w_{n+1}$ and $w_{n+2}$ or the wefts numbered as $w_{n-1}$ and $w_n$ are located at the same layer in a two-fold form:

changing distribution of the wefts by controlling a heald lifting of the warps, so that positions of the wefts in the vane profile-platform junction are changed along the thickness direction, and numbering the changed wefts in the platform area along the thickness direction as

\*\*

$w_1-w_{2n}$; and a set composed of the weft numbers in the vane profile area and the platform area being in a one-to-one mapping relationship, and 2n wefts having 2n factorial methods of bifurcation.

In an embodiment of the present disclosure, as shown in FIG. 3A-3D, the bifurcation structure of the vane profile-platform junction includes an uncrossed structure, a crossed structure or a crossed and entangled structure, and more preferably a crossed and entangled structure. In the present disclosure, when the bifurcation structure of the vane profile-platform junction is an uncrossed structure, the wefts in the vane profile-platform junction are numbered as $w_1$, $w_2, \ldots, w_n, w_{n+1}, w_{n+2}, \ldots, w_{2n}$; when the bifurcation structure of the vane profile-platform junction is a crossed structure, the wefts in the vane profile-platform junction are numbered as $w_{n+1}, w_{n+2}, \ldots, w_{2n}, w_1, w_2, \ldots, w_n$; and when the bifurcation structure of the vane profile-platform junction is a crossed and entangled structure, the wefts in the vane profile-platform junction are numbered as $w_{2n}$, $w_{2n-1}, \ldots, w_{n+1}, w_n, w_{n-1}, \ldots, w_1$.

In the present disclosure, the preform of the three-dimensional orthogonal woven outlet guide vane is woven according to the above set conditions. In the present disclosure, a device for weaving preferably includes a jacquard or a three-dimensional loom.

Figure 4:
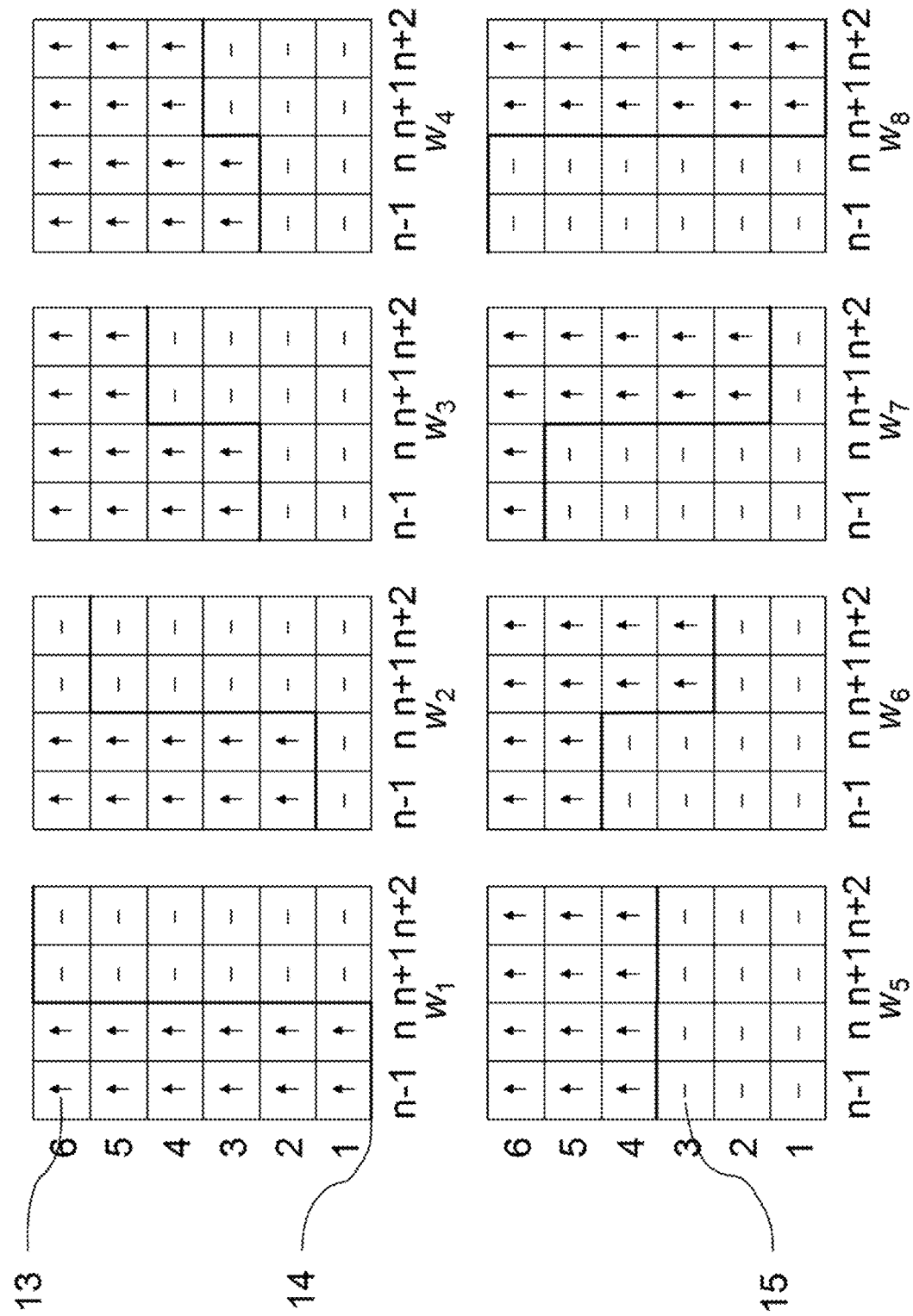
FIG. 4 is a schematic diagram of jacquard patterns during weaving, where 13 represents that the warps are lifted, 14 represents the path of the wefts, and 15 represents that the warps remain stationary.

In the present disclosure, the weaving preferably includes the following steps:

(31) weaving the vane profile area and the platform area; sequentially lifting, from bottom to top, the warps above a position where a target weft is located, and sequentially inserting the wefts, as shown in FIG. 4;

(32) weaving the vane profile-platform junction:

sequentially adding the wefts $w_1$ to $w_{2n}$, and lifting, on a side of the vane profile-platform junction near the vane profile area, the warps above a position where a target weft $w_i$ is located: lifting, on a side of the vane profile-platform junction near the platform area, the warps above a position where a target number weft $w_i^*$ corresponding to $w_i$ is located, inserting the wefts, and repeating this process.

After the preform of the three-dimensional orthogonal woven outlet guide vane is obtained, in the present disclosure, the preform of the three-dimensional orthogonal woven outlet guide vane is sequentially formed and processed to obtain the three-dimensional orthogonal woven composite outlet guide vane. In the present disclosure, preferably, the manufacturing of the three-dimensional woven outlet guide vane is realized by means of resin transfer molding (RTM) technology.

Figure 5:
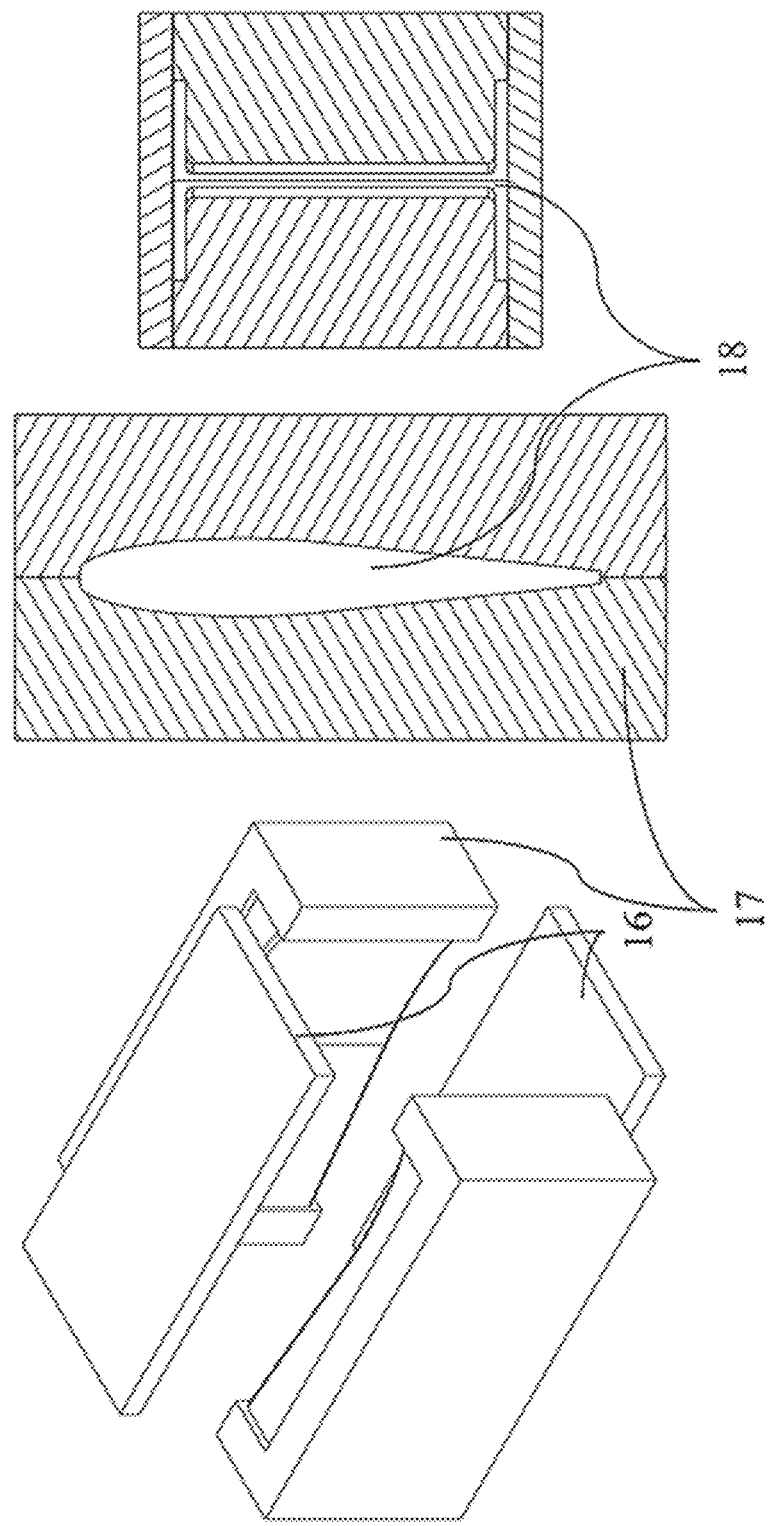
FIG. 5 is a schematic diagram of molds, where platform area molds 16, vane profile area molds 17 and a cavity 18 formed by the closed molds are shown.

In the present disclosure, the forming process preferably includes unfolding the preform of the three-dimensional orthogonal woven outlet guide vane in the molds, and more preferably includes: sequentially compacting and fastening the vane profile area, expanding the vane profile-platform junction, compacting the vane profile-platform junction and compacting and fastening the platform area by means of molds shown in FIG. 5 in the order of the vane profile area, the vane profile-platform junction and the platform area, to complete the forming of the preform of the outlet guide vane, and fastening the molds.

In the present disclosure, the method for manufacturing is preferably resin transfer molding (RTM). In the present disclosure, the manufacturing is preferably pressure infusion molding or vacuum infusion molding. According to the present disclosure, there are no special requirements for the specific process parameters of the manufacturing, and a conventional manufacturing process in the field can be used.

In a specific embodiment of the present disclosure, the pressure infusion molding includes the following steps: (I) preheating the closed molds and a resin system for 2 hours at 50° C. until the temperatures of the molds and the resin are uniform: (II) connecting a liquid storage apparatus, the molds, and an outlet liquid storage apparatus, and checking the air tightness: (III) mixing resin components, degassing in a vacuum, and infusing into the liquid storage apparatus: (IV) opening a feed valve and an outlet port valve, and injecting resin at 0.1 MPa: (V) injecting the resin for 3 minutes, and when there is no obvious bubble at an outlet port, closing the feed valve, and then closing the outlet port valve: (VI) transferring the molds injected with the resin to an oven, and heating at 100° ° C. for 2 hours.

In a specific embodiment of the present disclosure, the vacuum infusion molding includes the following steps: (I) preheating the closed molds and a resin system for 2 hours at 50° C. until the temperatures of the molds and the resin are uniform: (II) connecting a liquid storage bottle, the molds, a resin storage tank, and a vacuum pump, and checking the air tightness: (III) mixing resin components, degassing in a vacuum, and infusing into the resin storage tank: (IV) closing a feed port valve, starting the vacuum pump, and opening an outlet port valve, until the air pressure in the molds is stable and less than 2 kPa: (V) slowly opening the feed port valve, injecting resin for 3 minutes, and when there is no obvious bubble at an outlet port, closing the feed port valve, and then closing the outlet port valve: (VI) transferring the molds injected with the resin to an oven, and heating at 100° ° C. for 2 hours.

In the present disclosure, preferably, post-processing is further included after the manufacturing. In the present disclosure, the post-processing is preferably one or more of grinding, polishing, and drilling.

The present disclosure provides a three-dimensional orthogonal woven composite outlet guide vane prepared by the manufacturing method described in the above technical solution.

The technical solutions of the present disclosure will be clearly and completely described below with reference to the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

Embodiment 1

A three-dimensional orthogonal woven composite outlet guide vane with platform spacing of 120 mm, vane profile thickness of 4 mm, platform thickness of 2 mm and vane profile width of 20 mm was manufactured.

(1) Specific weaving parameters were as follows:

There were a total of six warp layers in a vane profile area, and there were 12 k (TorayT700-12 k) yarn in each layer: there were a total of seven weft layers, and there were 12 k (TorayT700-12 k) yarn in each layer, where the yarns in the third layer were in a two-fold form (there was a total of 24 k filaments); there were 12 k (TorayT700-12 k) z-direction yarn: in the vane profile area, the warp density was 3.33 ends/cm, and the weft density was 2.22 picks/cm; and there was a total of thirty-eight groups of warps and five groups of wefts in the vane profile area.

On a side of a platform area, there were a total of three warp layers, and there were 24 k (TorayT700-24 k) yarn in each layer: there were a total of four weft layers, and there were 12 k (TorayT700-12 k) yarn in each layer: in the platform area, the warp density was 1.67 ends/cm, and the weft density was 2.22 picks/cm; and there was a total of eight groups of warps and five groups of wefts in the platform area.

There are three types of structures of wefts in a vane profile-platform junction: an uncrossed structure, a crossed structure, and a crossed and entangled structure.

(2) Specific manufacturing parameters were as follows:

1) Forming

Sequentially, the vane profile area was compacted and fastened, the vane profile-platform junction was expanded, the vane profile-platform junction was compacted and the platform area was compacted, and fastened by molds in the order of the vane profile area, the vane profile-platform junction and the platform area, to complete the forming of the preform of the outlet guide vane, and the molds were fastened.

2) Manufacturing

Figure 12:
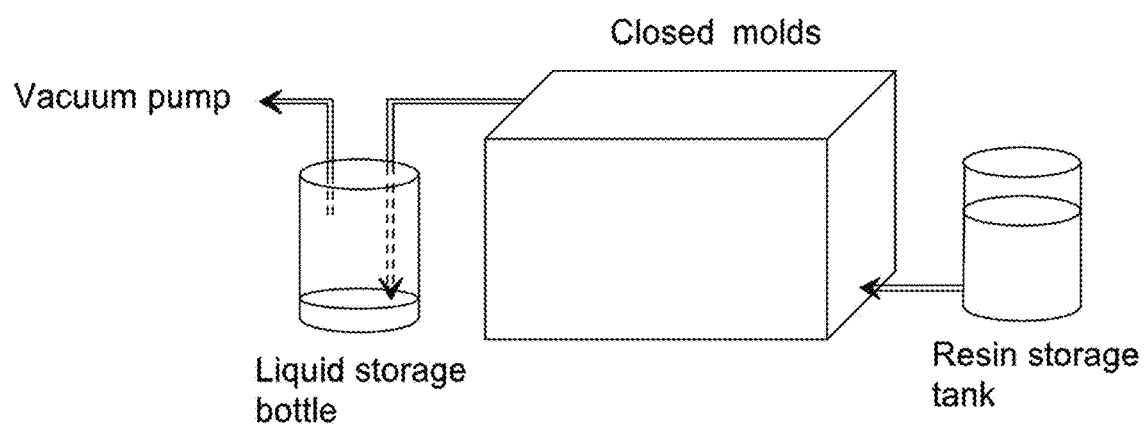
FIG. 12 is a schematic diagram of a device for vacuum infusion molding.

Vacuum infusion was used for the RTM process. As shown in FIG. 12. (I) the closed molds and a resin system (with a brand No. of EpoTech-4360A/B) were preheated for 2 hours at 50° C. until the temperatures of the molds and the resin were uniform: (II) a liquid storage bottle, the molds, a resin storage tank, and a vacuum pump were connected, and the air tightness was checked; (III) resin components were mixed, were degassed in a vacuum, and were infused into the resin storage tank; (IV) a feed port valve was closed, the vacuum pump was started, and an outlet port valve was opened, until the air pressure in the molds was stable and less than 2 kPa: (V) the feed port valve was slowly opened, the resin was injected for 3 minutes, and when there was no obvious bubble at an outlet port, the feed port valve was closed, and then the outlet port valve was closed; and (VI) the molds infused with the resin were transferred to an oven, and were heated at 100° C. for 2 hours.

Figure 6:
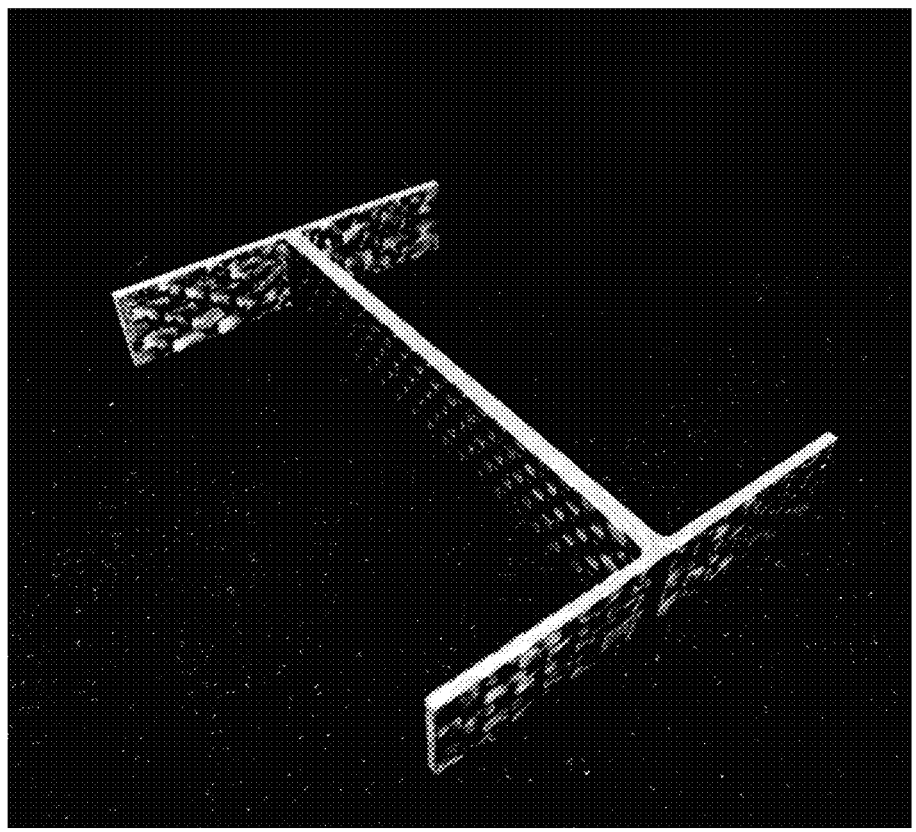
FIG. 6 shows a sample without post-processing after manufacturing.
Figure 7:
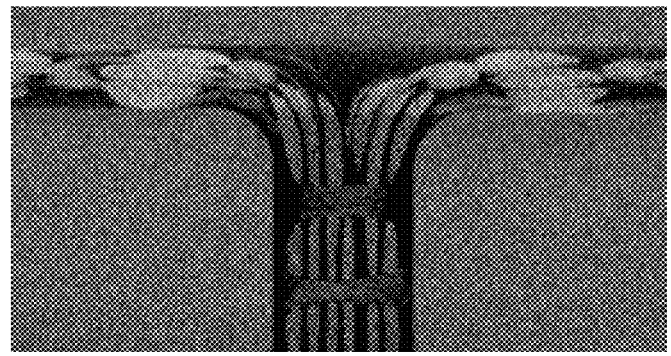
FIG. 7 is a computed tomography (CT) image of a vane profile-platform junction of a sample obtained by means of an uncrossed structure.
Figure 8:
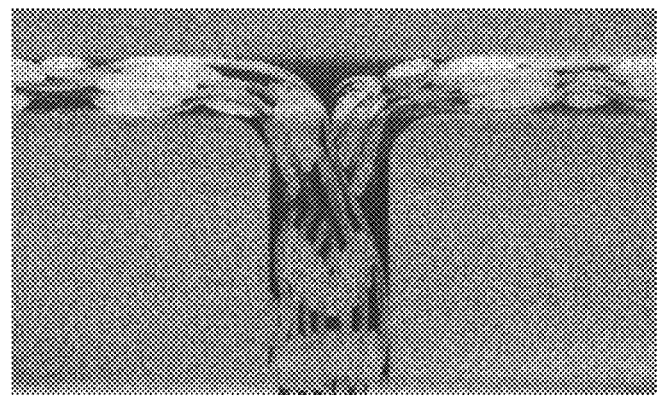
FIG. 8 is a micro-CT image of a vane profile-platform junction of a sample obtained by means of a crossed structure.
Figure 9:
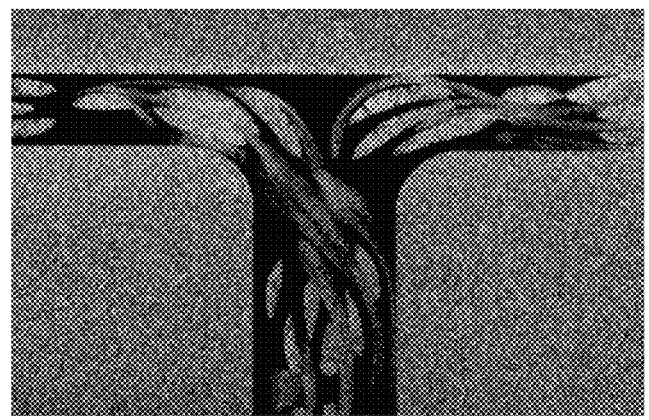
FIG. 9 is a micro-CT image of a vane profile-platform junction of a sample obtained by means of a crossed and entangled structure.

FIG. 6 shows a sample without post-processing after manufacturing, and its vane profile-platform junction was scanned by micro-CT, as shown in FIGS. 7-9. FIG. 7 shows a sample obtained by means of an uncrossed structure, FIG. 8 shows a sample obtained by means of a crossed structure, and FIG. 9 shows a sample obtained by means of a crossed and entangled structure.

Figure 10:
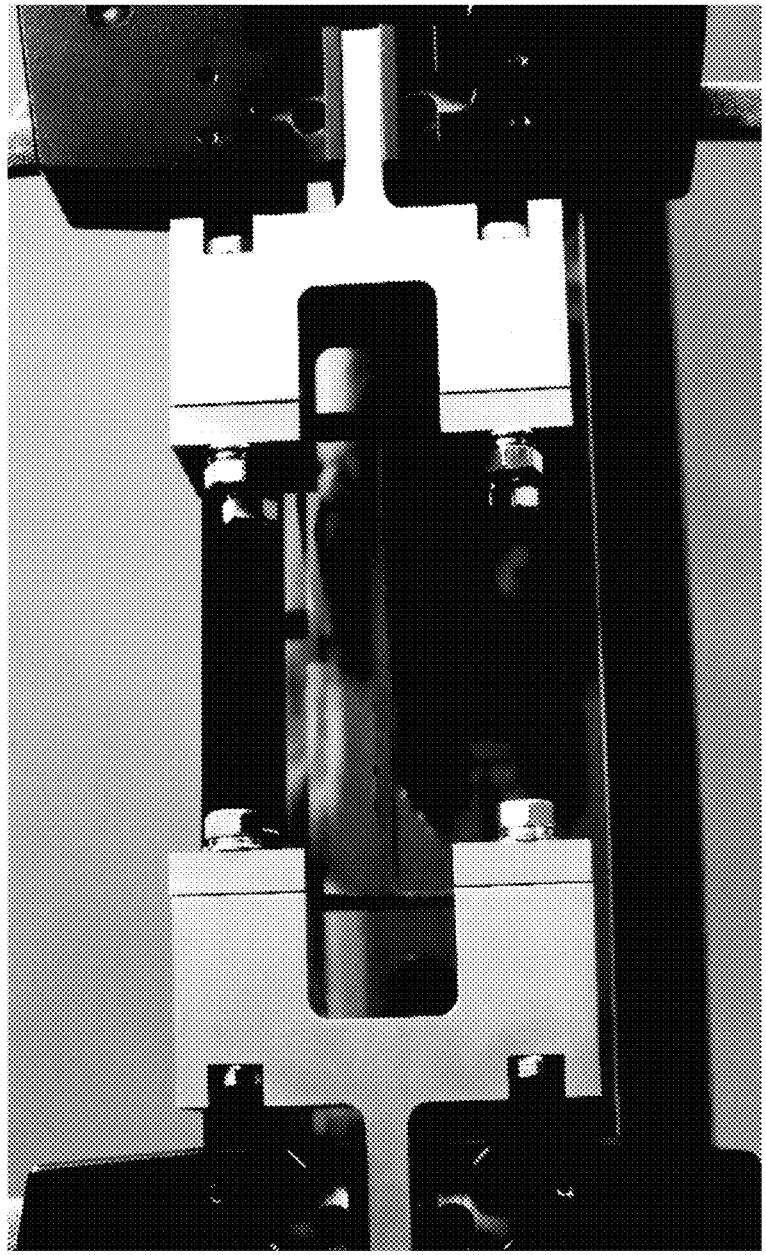
FIG. 10 is a photo of a device used in a tensile test.

A tensile test was performed on three outlet guide vanes (OGV) test pieces prepared in this embodiment and OGV test pieces without 3D reinforcement manufactured by a laminating method. The photo of a test device is shown in FIG. 10. The testing machine includes a manual self-clamping wedge fixture, a pneumatic fixture, a pressure disc fixture, a variable-gage-length extensometer, and a fully-automatic extensometer.

Figure 11:
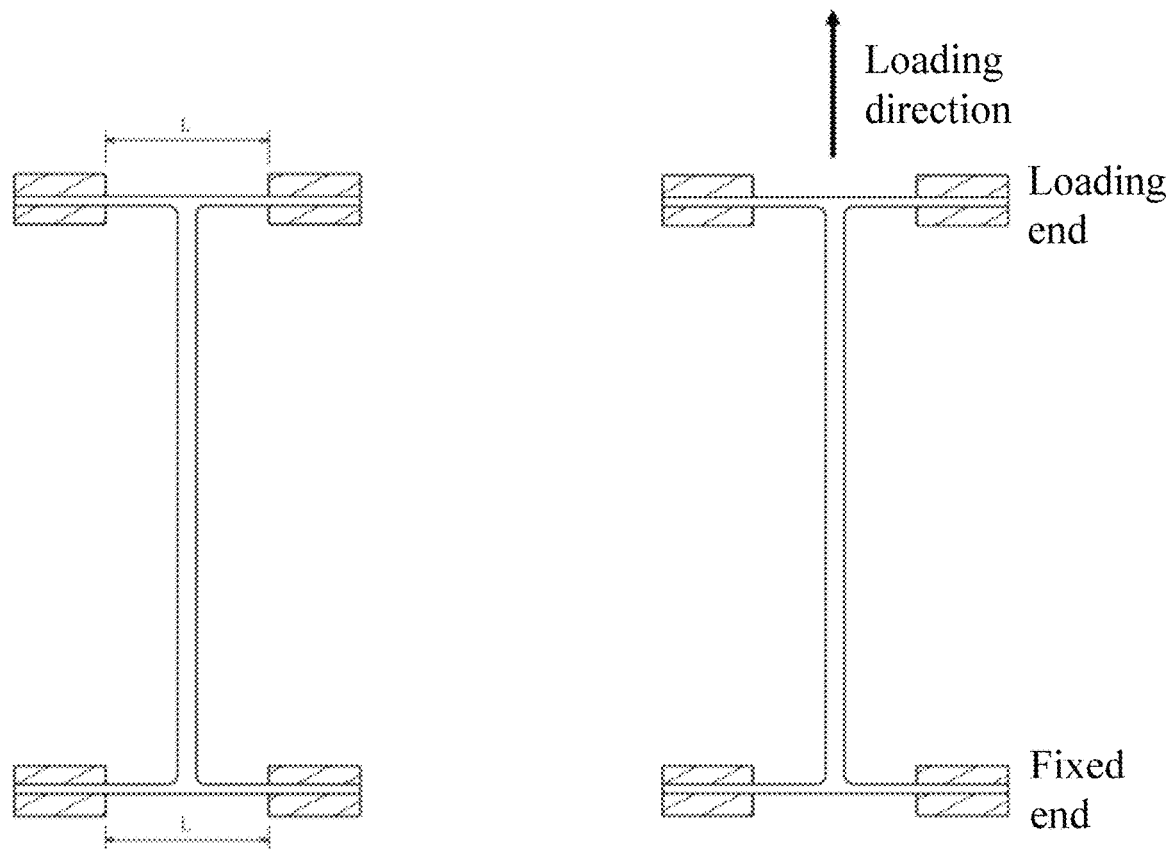
FIG. 11 is a schematic diagram of a tensile test.

The test method was as follows. A platform was clamped by a clamp for each test piece, and a schematic diagram of the clamping and tensile test of the test piece is shown in FIG. 11. The tensile test was performed with one end fixedly supported and the other end for loading. The torque of a clamping bolt was 15 N·m, with a length of L=35 mm, and a loading speed of 1 mm/min. Test conditions were as follows: an ambient temperature of 23±3° C.; and a relative humidity of (50±10)% RH. Results are shown in Table 1.

TABLE 1

Performance results of test pieces

| Test piece category | Average value of maximum loads (kN) | Average value of slopes of linear segments (kN/mm) |
|---|---|---|
| Laminated comparison | 1.0364 | 0.4646 |
| Uncrossed structure | 3.4440 | 0.4732 |
| Crossed structure | 5.2778 | 0.4672 |
| Crossed and entangled structure | 5.2633 | 0.6215 |

As can be seen from Table 1, under a tensile condition, an average value of maximum loads (strengths) of three-dimensional woven outlet guide vanes with different bifurcation structures was much greater than that of a control group, and there were significant differences among the uncrossed structure, the crossed structure, and the crossed and entangled structure. The three-dimensional woven outlet guide vanes had basically the same slope (stiffness) of linear segments as that of the control group, and the average value of that of the crossed and entangled structure was significantly higher than that of the control group. In conclusion, compared with the control group, the three-dimensional woven outlet guide vanes with different bifurcation structures had certain advantages in stiffness and strength, and different bifurcation structures had significant influences on performance, so there is a great design space and application potential for different application environments.

Embodiment 2

A three-dimensional orthogonal woven composite outlet guide vane with a platform spacing of 400 mm, a vane profile chord length of 150 mm, a chord curvature of 10%, and a thickness of 0-7.2 mm was manufactured.

(1) Specific weaving parameters were as follows:

There were a total of eight warp layers in a vane profile area, and there were 12 k (TorayT700-12 k) yarn in each layer: there were a total of nine weft layers, and there were 12 k (TorayT700-12 k) or 24 k (TorayT700-24 k) yarn in each layer, where the yarns in the fifth layer were in a two-fold form; there were 12 k (TorayT700-12 k) z-direction yarn: in the vane profile area, the warp density was 3.33 ends/cm, and the weft density was 2.22 picks/cm; and there was a total of one hundred and thirty-three groups of warps and forty-five groups of wefts in the vane profile area.

On a side of a platform area, there were a total of four warp layers, and there were 24 k (TorayT700-24 k) yarn in each layer: there were a total of five weft layers, and there were 12 k (TorayT700-12 k) or 24 k (TorayT700-24 k) yarn in each layer: in the platform area, the warp density was 3.33 ends/cm, and the weft density was 2.22 picks/cm; and there was a total of thirty-three groups of warps and forty-five groups of wefts in the platform area.

The wefts in the vane profile-platform junction had a crossed and entangled structure in this embodiment.

For thickness changes, specific weaving parameters are shown in Table 2. The position numbers of forty-five groups of wefts are provided in a column direction, and the numbers of the weft layers are provided in a row direction. Filament counts are provided in blocks at corresponding positions.

TABLE 2

Weaving parameters for the thickness changes of wefts in a vane profile-platform junction

| No | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 12 k | 12 k | 12 k | 12 k | 12 k | 12 k | 12 k | 12 k | 12 k | 12 k | 12 k | 12 k | 12 k | 12 k | 12 k |
| 2 | 12 k | 12 k | 12 k | 12 k | 12 k | 12 k | 12 k | 12 k | 12 k | 12 k | 24 k | 24 k | 24 k | 24 k | 24 k |
| 3 | 12 k | 12 k | 12 k | 12 k | 12 k | 12 k | 12 k | 12 k | 12 k | 12 k | 24 k | 24 k | 24 k | 24 k | 24 k |
| 4 | 12 k | 12 k | 12 k | 12 k | 12 k | 12 k | 12 k | 12 k | 12 k | 12 k | 24 k | 24 k | 24 k | 24 k | 24 k |
| 5/e | 24 k | 24 k | 24 k | 24 k | 24 k | 24 k | 24 k | 24 k | 24 k | 24 k | 24 k | 24 k | 24 k | 24 k | 24 k |
| d | 12 k | 12 k | 12 k | 12 k | 12 k | 12 k | 12 k | 12 k | 12 k | 12 k | 24 k | 24 k | 24 k | 24 k | 24 k |
| c | 12 k | 12 k | 12 k | 12 k | 12 k | 12 k | 12 k | 12 k | 12 k | 12 k | 24 k | 24 k | 24 k | 24 k | 24 k |
| b | 12 k | 12 k | 12 k | 12 k | 12 k | 12 k | 12 k | 12 k | 12 k | 12 k | 24 k | 24 k | 24 k | 24 k | 24 k |
| a | 12 k | 12 k | 12 k | 12 k | 12 k | 12 k | 12 k | 12 k | 12 k | 12 k | 12 k | 12 k | 12 k | 12 k | 12 k |

| No | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| 1 | 12 k | 12 k | 12 k | 12 k | 12 k | 12 k | 12 k | 12 k | 12 k | 12 k | 12 k | 12 k | 12 k | 12 k | 12 k |
| 2 | 24 k | 24 k | 24 k | 24 k | 24 k | 24 k | 24 k | 24 k | 24 k | 24 k | 24 k | 24 k | 24 k | 12 k | 12 k |
| 3 | 24 k | 24 k | 24 k | 24 k | 24 k | 24 k | 24 k | 24 k | 24 k | 24 k | 24 k | 24 k | 24 k | 12 k | 12 k |
| 4 | 24 k | 24 k | 24 k | 24 k | 24 k | 24 k | 24 k | 24 k | 24 k | 24 k | 24 k | 24 k | 24 k | 24 k | 24 k |
| 5/e | 24 k | 24 k | 24 k | 24 k | 24 k | 24 k | 24 k | 24 k | 24 k | 24 k | 24 k | 24 k | 24 k | 24 k | 24 k |
| d | 24 k | 24 k | 24 k | 24 k | 24 k | 24 k | 24 k | 24 k | 24 k | 24 k | 24 k | 24 k | 24 k | 24 k | 24 k |
| c | 24 k | 24 k | 24 k | 24 k | 24 k | 24 k | 24 k | 24 k | 24 k | 24 k | 24 k | 24 k | 24 k | 12 k | 12 k |
| b | 24 k | 24 k | 24 k | 24 k | 24 k | 24 k | 24 k | 24 k | 24 k | 24 k | 24 k | 24 k | 24 k | 12 k | 12 k |
| a | 12 k | 12 k | 12 k | 12 k | 12 k | 12 k | 12 k | 12 k | 12 k | 12 k | 12 k | 12 k | 12 k | 12 k | 12 k |

| No | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|
| 1 | 12 k | 12 k | 12 k | 12 k | 12 k | 12 k | 12 k | 12 k | 12 k | 12 k | 12 k | 12 k | 12 k | 12 k | 12 k |
| 2 | 12 k | 12 k | 12 k | 12 k | 12 k | 12 k | 12 k | 12 k | 12 k | 12 k | 12 k | 12 k | 12 k | 12 k | 12 k |
| 3 | 12 k | 12 k | 12 k | 12 k | 12 k | 12 k | 12 k | 12 k | 12 k | 12 k | 12 k | 12 k | 12 k | 12 k | 12 k |
| 4 | 24 k | 24 k | 24 k | 24 k | 24 k | 12 k | 12 k | 12 k | 12 k | 12 k | 12 k | 12 k | 12 k | 12 k | 12 k |
| 5/e | 24 k | 24 k | 24 k | 24 k | 24 k | 24 k | 24 k | 24 k | 24 k | 24 k | 24 k | 24 k | 24 k | 24 k | 24 k |
| d | 24 k | 24 k | 24 k | 24 k | 24 k | 12 k | 12 k | 12 k | 12 k | 12 k | 12 k | 12 k | 12 k | 12 k | 12 k |
| c | 12 k | 12 k | 12 k | 12 k | 12 k | 12 k | 12 k | 12 k | 12 k | 12 k | 12 k | 12 k | 12 k | 12 k | 12 k |
| b | 12 k | 12 k | 12 k | 12 k | 12 k | 12 k | 12 k | 12 k | 12 k | 12 k | 12 k | 12 k | 12 k | 12 k | 12 k |
| a | 12 k | 12 k | 12 k | 12 k | 12 k | 12 k | 12 k | 12 k | 12 k | 12 k | 12 k | 12 k | 12 k | 12 k | 12 k |

Figure 13:
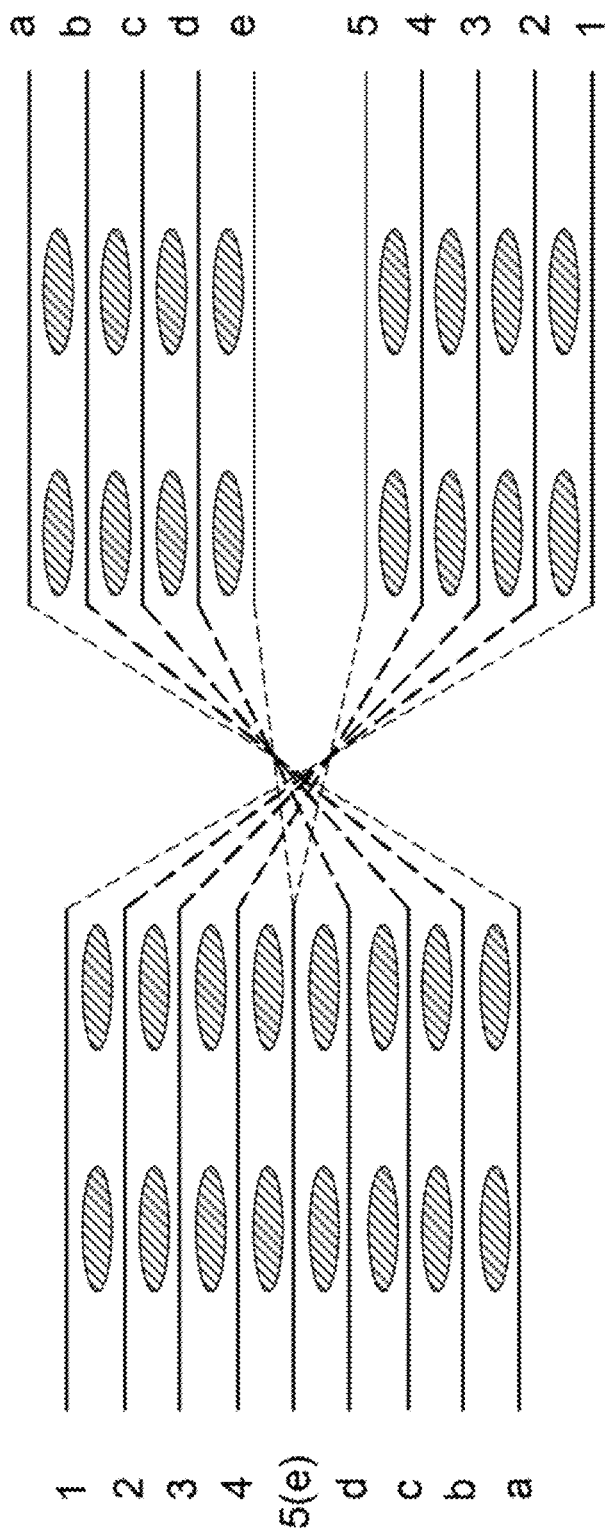
FIG. 13 is a structural diagram of a twenty-five column platform-vane profile junction.

Taking twenty-five columns as an example, its vane profile-platform junction is shown in FIG. 13. Thick lines correspond to wefts with a filament count of 24 k, and thin lines represent wefts with a filament count of 12 k.

(2) Specific manufacturing parameters were as follows:

1) Forming

Figure 14:
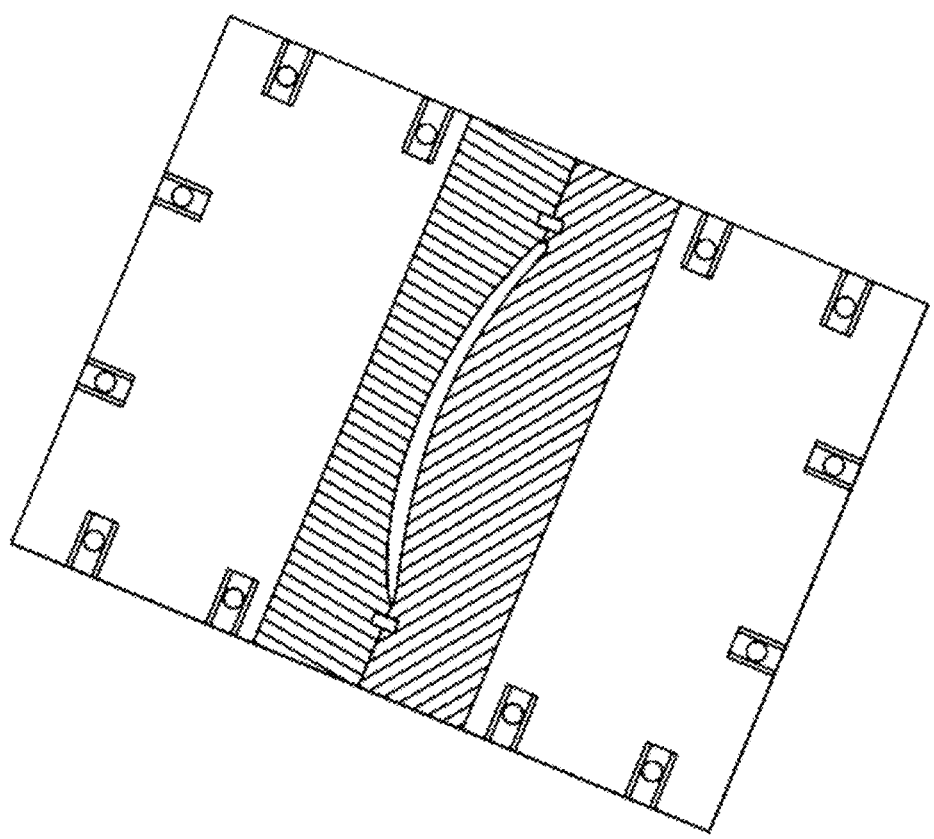
FIG. 14 is a schematic diagram of a mold cavity.

Sequentially, the vane profile area was compacted and fastened, the vane profile-platform junction was expanded, the vane profile-platform junction was compacted and the platform area was compacted, and fastened by molds in the order of the vane profile area, the vane profile-platform junction and the platform area, to complete the forming of the preform of the outlet guide vane, and the molds were fastened. A mold cavity is shown in FIG. 14.

2) Manufacturing

Vacuum infusion was used for the RTM process. As shown in FIG. 12, (I) the closed molds and a resin system (with a brand No. of IN2) were preheated for 2 hours at 50° ° C. until the temperatures of the molds and the resin were uniform; (II) a liquid storage bottle, the molds, a resin storage tank, and a vacuum pump were connected, and the air tightness was checked; (III) resin components were mixed, were degassed in a vacuum, and were infused into the resin storage tank; (IV) a feed port valve was closed, the vacuum pump was started, and an outlet port valve was opened, until the air pressure in the molds was stable and less than 2 kPa; (V) the feed port valve was slowly opened, the resin was injected for 10 minutes, and when there was no obvious bubble at an outlet port, the feed port valve was closed, and then the outlet port valve was closed; and (VI) the molds infused with the resin were transferred to an oven, and were heated at 100° C. for 3 hours.

Figure 15:
FIG. 15 is a sample diagram.

FIG. 15 shows a formed sample.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A manufacturing method for a three-dimensional orthogonal woven composite outlet guide vane, comprising the following steps:
    (1) setting weaving parameters of a vane profile area and parameters of a platform area according to requirements for geometric dimensions of an outlet guide vane;
    (2) setting a bifurcation of a vane profile-platform junction according to the requirements for the geometric dimensions of the outlet guide vane in step (1) and requirements for mechanical performance of the outlet guide vane under different loads;
    (3) weaving a preform of the three-dimensional orthogonal woven outlet guide vane according to conditions set in steps (1) and (2);
    (4) sequentially forming the preform and manufacturing the three-dimensional orthogonal woven composite outlet guide vane;
    step (2) comprises:
    numbering wefts in the vane profile area of the preform of the three-dimensional woven outlet guide vane as $w_1-w_{2n}$ along a thickness direction, wherein n is an integer; number of the wefts in the vane profile area is even; wefts numbered as $w_{n+1}$ and $w_{n+2}$ or wefts numbered as $w_{n-1}$ and $w_n$ are located at a same layer in a two-fold form;
    changing distribution of wefts by controlling a heald lifting mode of warps, so that positions of wefts in the vane profile-platform junction are changed along the thickness direction, and numbering changed wefts in the platform area along the thickness direction as $w_1^*-w_{2n}^*$; and
    a set composed of weft number in the vane profile area and weft number in the platform area being in a one-to-one mapping relationship, and 2n wefts having 2n factorial methods of bifurcation.

2. The manufacturing method according to claim 1, wherein step (1) comprises:
    (11) calculating an equivalent thickness $t_1=V_1/lh$ of the vane profile area according to a vane profile chord length l, a platform inner surface spacing h, and a volume $V_1$ of the vane profile area, and with the equivalent thickness $t_1$ of the vane profile area as a basic thickness, setting a number $n_j$ of warp layers and a number $n_w$ of weft layers in the vane profile area to satisfy $n_j=n_w-1$;
    (12) setting fiber volume fraction of the vane profile area to be 40%-60% by controlling warp density and weft density of the vane profile area;
    (13) enabling the vane profile area of the preform to meet vane profile requirements by controlling weft filament count, warp filament count and yarn density in different areas of the vane profile area; and
    (14) setting a basic thickness of the platform area to $t_3=0.5t_1$, the number of warp layers in the platform area to $0.5n_j$, and the number of weft layers in the platform area to $0.5n_j+1$.

3. The manufacturing method according to claim 2, wherein $n_j \geq 3$.

4. The manufacturing method according to claim 2, wherein the fiber volume fraction of the platform area is kept the same as that of the vane profile area.

5. The manufacturing method according to claim 1, wherein a device configured for weaving comprises a jacquard or a three-dimensional loom.

6. The manufacturing method according to claim 1, wherein the weaving in step (3) comprises:
    (31) weaving the vane profile area and the platform area:
    sequentially lifting, from bottom to top, warps above a position where a target weft is located, and sequentially inserting the wefts; and
    (32) weaving the vane profile-platform junction:
    sequentially adding wefts $w_1$ to $w_{2n}$, and lifting, on a side of the vane profile-platform junction near the vane profile area, warps above a position where a target weft $w_i$ is located; lifting, on a side of the vane profile-platform junction near the platform area, warps above a position where a target number weft $w_i^*$ corresponding to $w_i$ is located, inserting wefts, and repeating this process.

7. The manufacturing method according to claim 1, wherein the forming comprises: sequentially compacting and fastening the vane profile area, expanding the vane profile-platform junction, compacting the vane profile-platform junction and compacting and fastening the platform area by means of molds in the order of the vane profile area, the vane profile-platform junction and the platform area, to complete the forming of the preform of the outlet guide vane, and fastening the molds.

8. The manufacturing method according to claim 1, wherein the manufacturing is resin transfer molding.

9. A three-dimensional orthogonal woven composite outlet guide vane, manufactured by a manufacturing method comprising the following steps:
- (1) setting weaving parameters of a vane profile area and parameters of a platform area according to requirements for geometric dimensions of an outlet guide vane;
- (2) setting a bifurcation of a vane profile-platform junction according to the requirements for the geometric dimensions of the outlet guide vane in step (1) and requirements for mechanical performance of the outlet guide vane under different loads;
- (3) weaving a preform of the three-dimensional orthogonal woven outlet guide vane according to conditions set in steps (1) and (2); and
- (4) sequentially forming the preform and manufacturing the three-dimensional orthogonal woven composite outlet guide vane;

step (2) comprises:

numbering wefts in the vane profile area of the preform of the three-dimensional woven outlet guide vane as $w_1$-$w_{2n}$ along a thickness direction, wherein n is an integer; number of the wefts in the vane profile area is even; wefts numbered as $w_{n+1}$ and $w_{n+2}$ or wefts numbered as $w_{n-1}$ and $w_n$ are located at a same layer in a two-fold form;

changing distribution of wefts by controlling a heald lifting mode of warps, so that positions of wefts in the vane profile-platform junction are changed along the thickness direction, and numbering changed wefts in the platform area along the thickness direction as $w_1^*$-$w_{2n}^*$; and a set composed of weft number in the vane profile area and weft number in the platform area being in a one-to-one mapping relationship, and 2n wefts having 2n factorial methods of bifurcation.

10. The three-dimensional orthogonal woven composite outlet guide vane according to claim 9, wherein step (1) comprises:
- (11) calculating an equivalent thickness $t_1=V_1/lh$ of the vane profile area according to a vane profile chord length l, a platform inner surface spacing h, and a volume $V_1$ of the vane profile area, and with the equivalent thickness $t_1$ of the vane profile area as a basic thickness, setting a number $n_j$ of warp layers and a number $n_w$ of weft layers in the vane profile area to satisfy $n_j=n_w-1$;
- (12) setting fiber volume fraction of the vane profile area to be 40%-60% by controlling warp density and weft density of the vane profile area;
- (13) enabling the vane profile area of the preform to meet vane profile requirements by controlling weft filament count, warp filament count and yarn density in different areas of the vane profile area; and
- (14) setting a basic thickness of the platform area to $t_3=0.5t_1$, the number of warp layers in the platform area to $0.5n_j$, and the number of weft layers in the platform area to $0.5n_j+1$.

11. The three-dimensional orthogonal woven composite outlet guide vane according to claim 10, wherein $n_j \geq 3$.

12. The three-dimensional orthogonal woven composite outlet guide vane according to claim 10, wherein the fiber volume fraction of the platform area is kept the same as that of the vane profile area.

13. The three-dimensional orthogonal woven composite outlet guide vane according to claim 9, wherein a device configured for weaving comprises a jacquard or a three-dimensional loom.

14. The three-dimensional orthogonal woven composite outlet guide vane according to claim 9, wherein the weaving in step (3) comprises:
- (31) weaving the vane profile area and the platform area: sequentially lifting, from bottom to top, warps above a position where a target weft is located, and sequentially inserting the wefts; and
- (32) weaving the vane profile-platform junction: sequentially adding wefts $w_1$ to $w_{2n}$, and lifting, on a side of the vane profile-platform junction near the vane profile area, warps above a position where a target weft $w_i$ is located; lifting, on a side of the vane profile-platform junction near the platform area, warps above a position where a target number weft $w_i^*$ corresponding to $w_i$ is located, inserting wefts, and repeating this process.

15. The three-dimensional orthogonal woven composite outlet guide vane according to claim 9, wherein the forming comprises: sequentially compacting and fastening the vane profile area, expanding the vane profile-platform junction, compacting the vane profile-platform junction and compacting and fastening the platform area by means of molds in the order of the vane profile area, the vane profile-platform junction and the platform area, to complete the forming of the preform of the outlet guide vane, and fastening the molds.

16. The three-dimensional orthogonal woven composite outlet guide vane according to claim 9, wherein the manufacturing is resin transfer molding.

* * * * *